(12) United States Patent
Cogan et al.

(10) Patent No.: US 7,910,162 B2
(45) Date of Patent: Mar. 22, 2011

(54) GROUT FOR LAYING PAVER STONES AND METHOD OF USE

(76) Inventors: Bryan Cogan, Gilbert, AZ (US); Paul Malinasky, Scottsdale, AZ (US)

( * ) Notice: Subject to any disclaimer, the term of this patent is extended or adjusted under 35 U.S.C. 154(b) by 181 days.

(21) Appl. No.: 12/228,813

(22) Filed: Aug. 14, 2008

(65) Prior Publication Data

US 2010/0040781 A1    Feb. 18, 2010

(51) Int. Cl.
*B05D 1/00*    (2006.01)
*C04B 24/00*    (2006.01)

(52) U.S. Cl. .................................... 427/180; 106/816

(58) Field of Classification Search .................. 427/180; 106/816
See application file for complete search history.

(56) References Cited

U.S. PATENT DOCUMENTS

| | | |
|---|---|---|
| 5,489,333 A | 2/1996 | Soroushian et al. |
| 5,547,504 A | 8/1996 | Soroushian |
| 6,660,079 B2 * | 12/2003 | Jodlbauer et al. ............ 106/724 |
| 7,244,076 B2 * | 7/2007 | Whitson ........................ 404/73 |
| 2007/0049668 A1 * | 3/2007 | Garner .......................... 524/155 |

FOREIGN PATENT DOCUMENTS

JP    60033276    2/1985

* cited by examiner

*Primary Examiner* — Frederick J Parker

(74) *Attorney, Agent, or Firm* — Schmeiser, Olsen & Watts LLP

(57) ABSTRACT

A dry, non-shrink composition which is admixed with water to cure into a hard but flexible and non-shrinking grout for laying paver stones, the dry composition comprising ingredients by percent weight of: 94-96% silica sand; 2-4% polymer powder mixture of vinyl acetate, and a vinyl ester in equal proportions, jointly polymerized using ethane; 0.5-1.5% cement; and 0.5-1.5% colorant. The dry composition is swept into joints between paver stones and water is then added to hydrate the dry mixture which forms a grouting material with interlocking physical joints to a porous material such as travertine.

10 Claims, 2 Drawing Sheets

Figure 2:
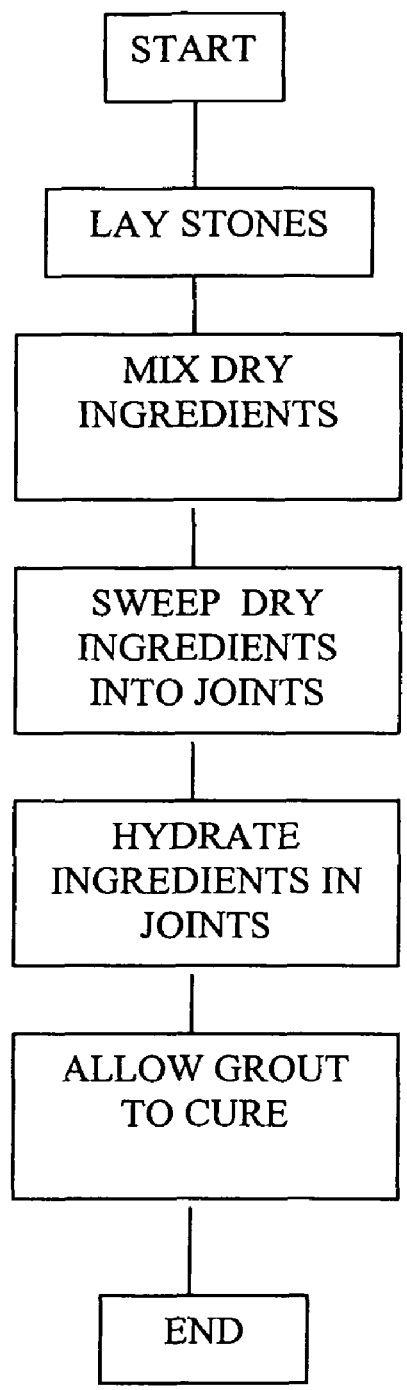

| INGREDIENT | MINIMUM AMOUNT Percent | MAXIMUM AMOUNT Percent |
| --- | --- | --- |
| Sand | 94 | 96 |
| Polymer Powder | 2 | 4 |
| Cement | 0.5 | 1.5 |
| Colorant | 0.5 | 1.5 |
| Water | 4 | 7 |

Fig. 1

GROUT FOR LAYING PAVER STONES AND METHOD OF USE

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

REFERENCE TO A "MICROFICHE APPENDIX"

Not applicable.

SEQUENCE LISTING

Not applicable.

BACKGROUND OF THE INVENTION

1. Field of the Present Disclosure

This disclosure relates generally to cements and grouts particularly adaptable for laying tiles and stones and to methods of use of such materials.

2. Description of Related Art Including Information Disclosed Under 37 CFR 1.97 and 1.98

Soroushian, U.S. Pat. No. 5,547,504 discloses a non-shrink grout including Portland cement, sand and an additive which is a polymer incorporating at least one of a calcium compound and aluminum metal so as to be reactive with the cement. The grout when fresh expands during curing by gas formation and by hydration and expands when hardened. The grout is useful in construction trades.

Soroushian et al, U.S. Pat. No. 5,489,333 discloses a Portland cement incorporating an expansive additive which is a polymer incorporating a calcium compound reactive with the cement. The shrinkage compensating concrete produced is much less likely to crack and is used in slabs and other structural systems where cracking of the concrete is a problem.

Japanese Patent No. 60033276 (Abstract; 1985) discloses numerous polymer compositions which have been suggested for use in concrete as inert fillers. Such uses of polymers include foamed styrene which is used for paver stones. Other patents describe polymer powders used as fillers. These polymers are essentially insert and do not cause the concrete to expand.

The related art describes the use of polymer compositions of grout applications and formulations and procedures thereof. However, the present disclosure distinguishes over the prior art providing heretofore unknown advantages as described in the following summary.

BRIEF SUMMARY OF THE INVENTION

This disclosure teaches certain benefits in construction and use which give rise to the objectives described below.

A dry, non-shrink composition which is admixed with water to cure into a hard but flexible and non-shrinking grout for laying paver stones, the dry composition comprising ingredients by percent weight of: 94-96% silica sand; 2-4% polymer powder mixture of vinyl acetate, and a vinyl ester in equal proportions, jointly polymerized using ethene, $C_2H_4$; 0.5-1.5% cement; and 0.5-1.5% colorant. The dry composition is swept into joints between paver stones and the water is then added to hydrate the dry mixture. When the paver stones are travertine, that is, porous calcium carbonate, the hydrated mixture forms interlocking attachments thereby establishing a very strong bond.

A primary objective inherent in the above described apparatus and method of use is to provide advantages not taught by the prior art.

Another objective is to provide a grout formulations that is preferably applied in the form of a dry powder.

A further objective is to provide such a grout that leaves no residue on natural stones.

A further objective is to provide such a grout that does not shrink upon hydration.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention In such drawing(s):

FIG. 1 is a table showing the ingredients of the dry mix of the present invention; and FIG. 2 is a stepwise flow diagram defining the present method.

DETAILED DESCRIPTION OF THE INVENTION

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it should be understood that what is illustrated is set forth only for the purposes of example and should not be taken as a limitation on the scope of the present apparatus and its method of use.

The present invention is a grout material composition and method of use that is particularly suitable for laying paver tiles especially those of a compact calcium carbonate, $CaCO_3$, in the form of porous calcite, usually referred to commercially by the name "travertine." Bonding is particularly strong when the present grout material is applied to travertine material because during the curing process, which is conducted after the dry ingredients are placed in the joints between stones the hydrated, polymer enters micro pores in the travertine and forms physical interlocking as it cures.

The present composition comprises components: sand, a polymer powder, Portland cement and optionally, iron oxide or other colorant. The sand used is graded between 30 and 90 grit depending on the tile thickness used. Preferably a 60 mesh silica sand performs best in joints that are from ⅛ inch and ⅝ inch wide. The polymer powder is a mechanical mixture of: vinyl acetate, and a vinyl ester in equal proportions, jointly polymerized using ethene C₂H₄, and further contains a finely ground mineral filler used as an anti-blocking agent in which secondary particles of the filler form an aggregation of the primary particles to form larger secondary particles having a diameter of less than substantially 0.4 micron. The polymer is dispersible in water and has good saponification resistance, that is, spontaneous reduction to a corresponding alcohol and acid or salt.

To prepare the dry grout mix, the above ingredients are mixed together with the sand comprising between about 94% to 96% by weight in the mixture, polymer powder between 2% and 4% by weight, and the cement between about 0.5% and 1.5% by weight, and with the iron oxide used sparingly between 0.5 and 1.5% by weight. These dry ingredients may be mixed by hand or in a blender, but temperature must be held near ambient during the mixing process. Rutile grade titanium dioxide replaces the iron oxide when pure white grout is desired. See the table of FIG. 1.

The polymer range is a maximum of 4% by weight, as any higher percent does not add much in performance and dramatically impacts cost. A lower percent dramatically reduces the strength of cohesion between paver sand particles. The cement is used to stabilize the ph of the polymer. Any amount below 0.5% will not stabilize the composition, and any amount above 1.5% will add to cost and require additional water. The sand improves particle packing density and acts as a filler only. The grout mix is applied dry into the joints between the paver stones, brushing the material into the spaces while leaving the top surface of the paver stones clean. Between 4% and 7% by weight, of water is applied to the dry mix allowing the mix to soak-up the water a natural hydration. No manual mixing is done once the water is applied to the joints. See FIG. 2.

The mix described above provides a superior grout having high strength, flexibility, adhesion to concrete, and it will not yellow with time.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A dry, non-shrink composition which is admixed with water to cure into a hard but flexible and non-shrinking grout for laying paver stones, the dry composition comprising ingredients by percent weight of:
   a) 94-96% silica sand;
   b) 2-4% polymer powder mixture of vinyl acetate, and a vinyl ester in equal proportions, jointly polymerized using ethene;
   c) 0.5-1.5% cement; and
   d) 0.5-1.5% colorant,
   wherein the silica sand is screened for a particle size between 30 and 90 grit.

2. The dry, non-shrink composition which is admixed with water to cure into a hard but flexible and non-shrinking grout for laying paver stones of claim 1, wherein the colorant is iron oxide.

3. The dry, non-shrink composition which is admixed with water to cure into a hard but flexible and non-shrinking grout for laying paver stones of claim 1, wherein the colorant is titanium dioxide.

4. The dry, non-shrink composition which is admixed with water to cure into a hard but flexible and non-shrinking grout for laying paver stones of claim 1, further comprising a finely ground mineral filler having an aggregation of primary particles forming secondary particles with a diameter of less than substantially 0.4 micron.

5. A method of grouting paver stones comprising the steps of:
   a) preparing a thoroughly mixed dry powder composition having by percent weight:
   94-96% silica sand; 2-4% polymer powder mixture of vinyl acetate, and a vinyl ester in equal proportions, jointly polymerized using ethene; 0.5-1.5% cement; and 0.5-1.5% colorant;
   b) sweeping the dry powder composition into joints between paver stones;
   c) adding between 4-7% by weight of water evenly distributed to the dry powder composition to form a hydrated grout mixture; and
   d) allowing the grout mixture to naturally cure,
   wherein the silica sand is screened for a particle size between 30 and 90 grit.

6. The method of grouting paver stones of claim 5 wherein the step of preparing the dry powder composition is by hand mixing the silica sand, polymer powder mixture, cement and colorant.

7. The method of grouting paver stones of claim 5 wherein the step of preparing the dry powder composition is by blending the silica sand, polymer powder mixture, cement and colorant while maintaining the dry powder composition at a temperature near ambient.

8. A method of grouting travertine stones of CaCO3 materials comprising the steps of:
   a) preparing a thoroughly mixed dry powder composition having by percent weight:
   94-96% silica sand; 2-4% polymer powder mixture of vinyl acetate, and a vinyl ester in equal proportions, jointly polymerized using ethene; 0.5-1.5% cement; and 0.5-1.5% colorant;
   b) sweeping the dry powder composition into joints between the travertine stones;
   c) adding between 4-7% by weight of water evenly distributed to the dry powder composition joints to form a hydrated grout mixture; and
   d) allowing the grout mixture to enter pores and spaces in the travertine stones and naturally cure to form interlocking bonds between the travertine stones and the grout mixture,
   wherein the silica sand is screened for a particle size between 30 and 90 grit.

9. The method of grouting paver stones of claim 8 wherein the step of preparing the dry powder composition is by hand mixing the silica sand, polymer powder mixture, cement and colorant.

10. The method of grouting paver stones of claim 8 wherein the step of preparing the dry powder composition is by blending the silica sand, polymer powder mixture, cement and colorant while maintaining the dry powder composition at a temperature near ambient.

* * * * *